United States Patent Office 3,509,909
Patented May 5, 1970

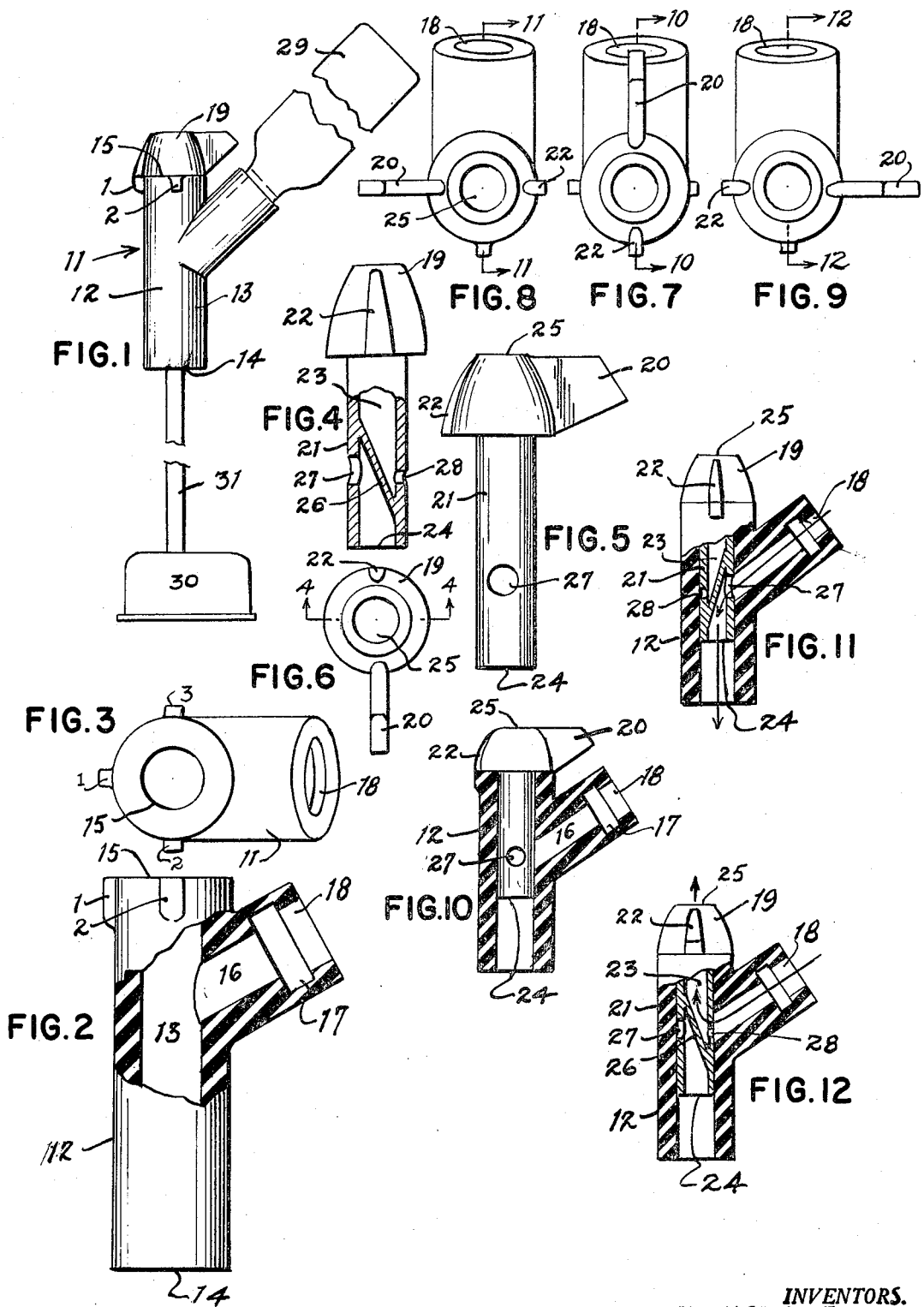

3,509,909
VACUUM VALVE
Charles E. Bender, New Paltz, Martin C. Parkinson, Hyde Park, and Douglas Frazer, New Paltz, N.Y., assignors to The Virtis Company, Inc., Gardiner, N.Y., a corporation of New York
Continuation of application Ser. No. 430,524, Feb. 5, 1965. This application June 29, 1967, Ser. No. 650,134
Int. Cl. F16k 11/08
U.S. Cl. 137—565    3 Claims

ABSTRACT OF THE DISCLOSURE

A vacuum valve is shown having a body made entirely of resilient material. The body is provided with a longitudinal tube therewithin which is open at both ends thereof. A transverse tube is angularly disposed at an acute angle with respect to the lougitudinal tube and communicates therewith. The transverse tube is closed at one end thereof. A stopcock having a stem portion is rotatably movable within the longitudinal tube. The stem portion of the stopcock is open at both ends thereof. An obliquely disposed barrier member intervenes the ends of the stem of the stopcock. The stopcock also has a handle portion which overlies one end of the longitudinal tube. A pair of openings are provided which join the interior of the stem portion with the exterior thereof. These openings are disposed on opposite sides of the barrier member. The openings are selectively registerable with the transverse tube. A cut-out portion is disposed within the interior of the transverse tube spaced from the opening thereof. This cut-out portion is right angularly disposed with respect to the tube and is of larger diameter than the tube, extending outwardly on both sides thereof. The opening is adapted to hold the mouth of a closed container.

The opposite end of the longitudinal tube is adapted to be connected to a source of vacuum. Adjacent the handle portion of the stopcock upon the exterior of the longitudinal tube are indicating means showing the position that the openings within the stem portion of the stopcock assume.

The structure described above permits vacuum to be selectively applied to a container, the vacuum held, or the vacuum released depending upon the position that the stem portion of the stopcock assumes.

This application is a continuation of Ser. No. 430,524, filed Feb. 5, 1965, and now abandoned.

DESCRIPTION OF THE INVENTION

This invention relates to a vacuum valve having specific utilization in the process of "freeze drying."

In this process it is necessary to have a simple and fool-proof device which will permit the production of vacuum, the holding of vacuum, and the releasing of vacuum simply, quickly and effectively.

Particularly, in freeze drying processes, if the vacuum is released too violently the material within the holding container which is being freeze dried will spurt out of the container and will be either lost or contaminated. If the vacuum is released too violently other problems will also occur which are well known to those skilled in this art.

The inventors have therefore produced a simple and foolproof device which has been specifically designed to avoid the defects involved in conventional devices. The device of this invention may very simply be utilized to permit vacuum, to hold vacuum, or to release vacuum gently, easily and without damage to the contents of the specimen container.

The foregoing constitutes a brief description of the instant invention and some of the objects and advantages thereof. Other objects and advantages of this invention may become apparent to the reader of this specification.

The invention will now be described by reference to the accompanying drawings which are made a part of this specification. However the reader is cautioned to note that the specific form of this invention set forth in the accompanying drawings is merely for illustrative purposes and for purposes of example only. Various changes and modifications may obviously be made within the spirit and scope of this invention.

FIG. 1 is a side perspective view of the vacuum valve of this invention. In this figure the specimen container is shown attached ot the valve of this invention and the device for producing vacuum (a vacuum pump) is shown diagrammatically.

FIG. 2 is a side elevational view, partly in section and on an enlarged scale, of the vacuum valve of this invention. The actuating member has been removed from this figure for clarity of illustration.

FIG. 3 is a plan view of the parts of the instant invention shown in FIG. 2.

FIG. 4 is a side elevational view, partly in section, of the actuating member of this invention.

FIG. 5 is a side elevational view of the actuating member of this invention.

FIG. 6 is a plan view of the actuating member of this invention.

FIG. 7 is a plan view of the vacuum valve in this invention with the parts in the position that they normally assume when it is desired to hold vacuum.

FIG. 8 is a view similar to that of FIG. 7 but showing the position of the parts when it is desired to produce vacuum.

FIG. 9 is a view similar to that of FIG. 7 but showing the position of the parts when it is desired to release the vacuum to atmosphere.

FIG. 10 is a sectional view taken along lines 10—10 of FIG. 7.

FIG. 11 is a sectional view taken along lines 11—11 of FIG. 8.

FIG. 12 is a sectional view taken along lines 12—12 of FIG. 9.

Now referring to the specific form of this invention for a detailed description thereof the valve 11 of this invention is formed with a housing 12 having a longitudinally disposed first conduit 13 which is open at its ends 14 and 15. Upon the outer surface of conduit 13 indicating markings 1, 2 and 3 are disposed. A second conduit 16 is angularly disposed with respect to conduit 13 and communicates therewith. Container holding means 17 which preferably consist of an angularly enlarged portion, are disposed adjacent the leading end 18 of conduit 16.

An actuating member 19 is formed with a handle portion 20 at its upper end thereof, a body portion 21 extending from handle portion 20 and an indicating portion 22 which is designed to abut indicating portions 1, 2 and 3 selectively so as to indicate the position of the valve. Actuating member 19 is also provided with a longitudinal opening 23 which is open at the lower end 24 and the upper end 25. An angularly disposed barrier member 26 intervenes conduit 23. A first lateral opening 27 is provided within portion 21 on one side of barrier member 26 and an additional lateral opening 28 is provided upon portion 21 on the opposite side of barrier member 26.

With the foregoing specific description the operation of this invention will now be explained. Material to be freeze dried (not shown) is placed within specimen container 29. Specimen container 29 is then pushed into position so that the flange of this container (not shown) will fit within portion 17. Body 12 is preferably made of resilient material, such as rubber or plastic, so as to permit this to be done. Portion 14 of the valve is then connected to a source of vacuum (such as a vacuum pump 30) by means of conduit 31. Actuating member 19 is placed in the position shown in FIG. 11 so that the air within container 29 is removed by vacuum pump 30 as shown by the arrows in FIG. 11. The proper positioning of actuating member 19 is indicated by juxtaposition of member 22 with the proper marking upon body 12. When the vacuum step has been completed and it is desired merely to hold vacuum then actuating member 19 is rotated into the position shown in FIG. 10. In this position the vacuum contained within container 29 cannot leave conduit 16 since it is blocked by the position of actuator 19. This position is also shown by juxtaposition of portion 22 of actuator 19 with the proper marker upon body 12.

When it is desired to release the vacuum from container 29 so that container 29 can be removed from the valve of this invention actuator 19 is turned in the position shown in FIG. 12. In this position conduit 16 is open to atmosphere and the vacuum contained within container 29 is released.

The foregoing sets forth manner in which the objects of this invention are achieved.

We claim:

1. A vacuum valve comprising a resilient valve body, a first passageway extending through said body, one end of said first passageway being adapted for connection to a source of vacuum, the opposite end of said first passageway being open to atmosphere, a second passageway having one end intersecting the first passageway at an angle thereto, said second passageway having the opposite end thereof open to atmosphere, said opposite end of said second passageway having a circumferentially enlarged portion adjacent the end thereof for reception of a neck portion of a container of material to be freeze dried, said neck portion being received in said enlarged portion with a vacuum-tight fit, stop cock means having a tubular stem snugly received in said opposite end of said first passageway, said stop cock means projecting beyond the end of said first passageway and including means to permit rotation thereof, said tubular stem extending within said first passageway beyond the point of intersection between said first and second passageways, a vacuum impervious wall extending tranversely to said tubular stem, said tubular stem inwardly of said vacuum impervious wall being open for direct communication with said vacuum source while said tubular stem on the opposite side of said wall is in direct communication with the atmosphere, a radially extending first port in a side wall of said passageway on the inner side of said vacuum impervious wall and a second port extending through said side wall of said tubular stem outwardly of said wall, each of said ports being located for rotation into alignment with said second passageway to permit said container on said opposite end of said passageway to be selectively placed in communication with said vacuum source and the atmosphere for freeze drying of said container and ease of removal after freeze drying.

2. The vacuum valve of claim 1 wherein said valve body and said stop cock means includes means to indicate the rotational position of said first and second ports relative to said passageway whereby an operator of said valve can readily determine the position of said first and second ports.

3. A freeze drying system comprising vacuum producing means, an evacuable chamber, connecting means between said vacuum producing means and said evacuable chamber, a vacuum valve joined to said connecting means, said vacuum valve including an elastomeric valve body, a first passageway extending through said body, one end of said first passageway being circumferentially disposed in vacuum-tight relation with said connecting means, the opposite end of said first passageway being open, a second passageway extending into said valve body, said second passageway having one end intersecting the first passageway at an angle thereto, said second passageway having an opposite end thereof formed with a circumferentially enlarged portion adjacent the end thereof for reception of a neck portion of a container of material to be freeze dried, said neck portion of said container being received in said circumferentially enlarged portion with a vacuum-tight fit, movable stop cock means having a stem portion snugly received in said opposite open end of said first passageway to close off said passageway, said stop cock means projecting beyond the end of said first passageway and including handle means to permit manual movement of said stem portion to control communication between said first and second passageways, said stem portion having at least a part thereof extending within said first passageway beyond the point of intersection between said first and second passageways, a vacuum impervious wall extending transversely of said stem portion and movable into a position to block the intersection between said passageways, said stem portion inwardly of said vacuum impervious wall being open for direct communication with said vacuum source while said stem portion on the opposite side of said wall is adapted for communication with the atmosphere, said handle means providing for manual movement of said vacuum impervious wall relative to said valve body to a position where the intersection between said first and second passageways is unblocked to permit free communication through said first and second passageways to said container, and port means extending through said side wall of said stem portion outwardly of said impervious wall, said port means being located for manual movement by said handle means into alignment with said second passageway to permit said container on said opposite end of said second passageway to be placed in communication with the atmosphere for breaking the vacuum therein to facilitate easy removal of said container after freeze drying.

References Cited

UNITED STATES PATENTS

| 3,276,472 | 10/1966 | Jinkens et al. | 137—625.41 |
| 10,633 | 3/1854 | Cross | 251—352 X |
| 3,165,386 | 1/1965 | Kapeker | 251—353 X |

FOREIGN PATENTS

| 62,601 | 6/1940 | Norway. | |

M. CARY NELSON, Primary Examiner

M. O. STURM, Assistant Examiner

U.S. Cl. X.R.

137—625.24